April 14, 1942. W. BALLARD 2,279,728
MEASURING SPOUT
Filed July 15, 1939 2 Sheets-Sheet 1
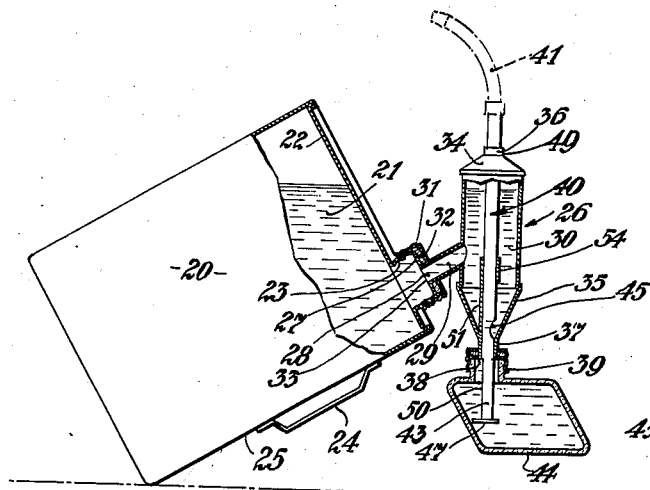
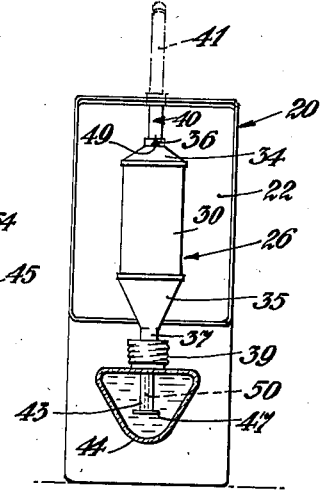
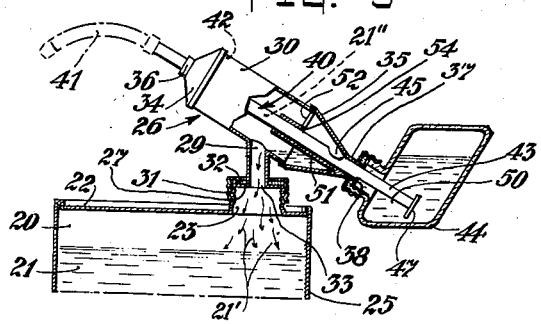
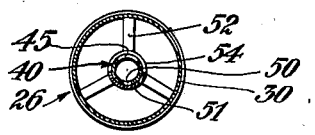
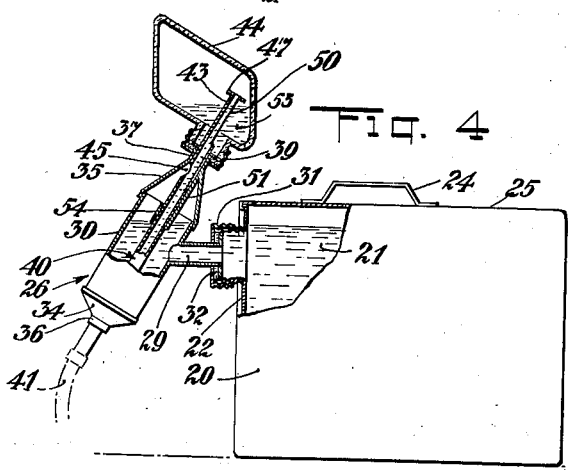
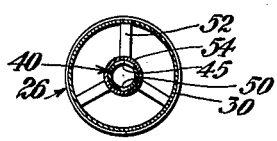
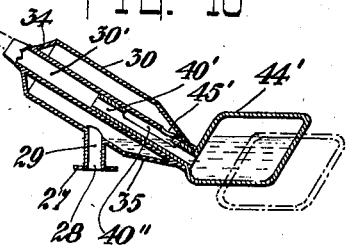
INVENTOR.
WALTER BALLARD
BY
ATTORNEY.

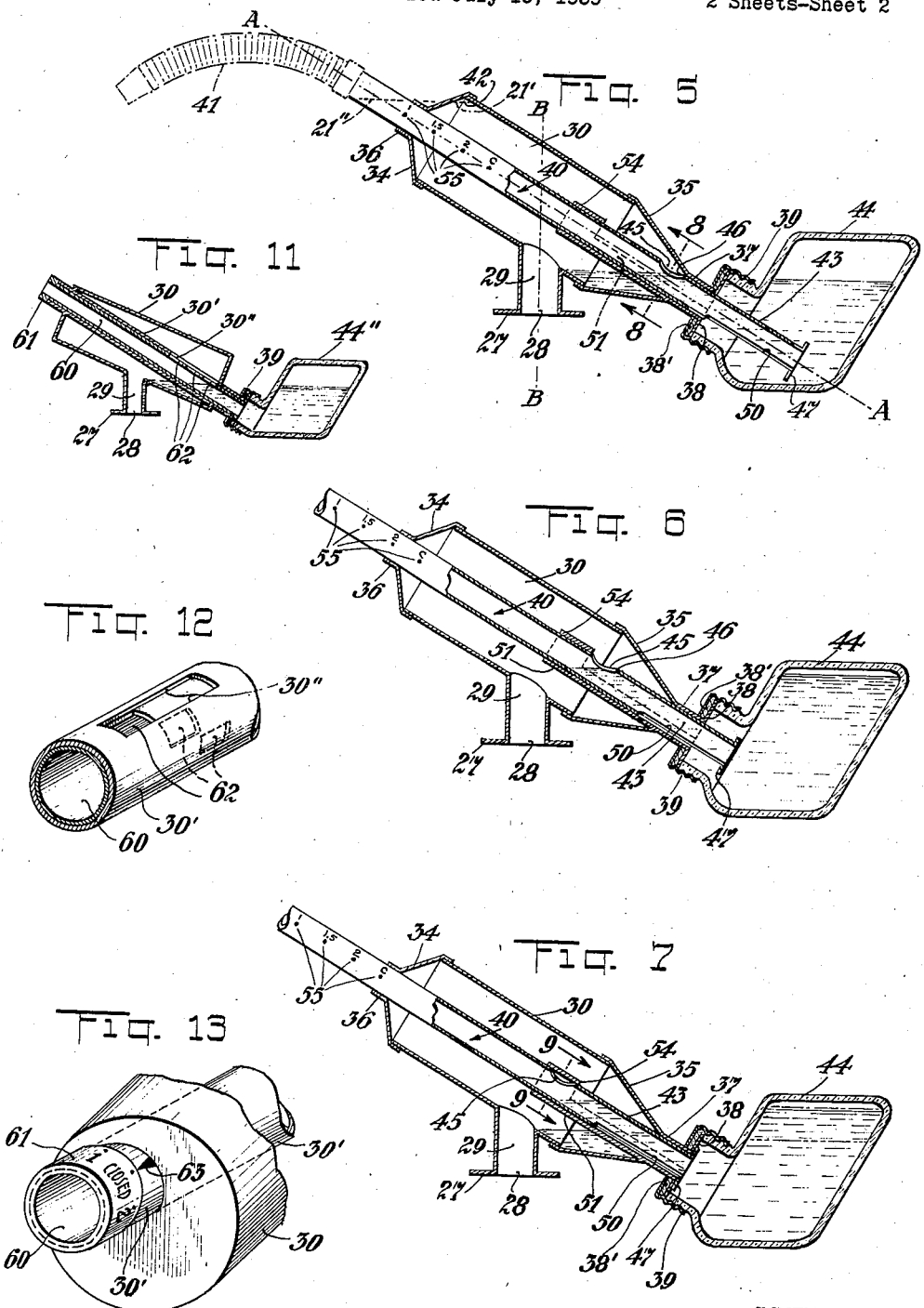

Patented Apr. 14, 1942

2,279,728

UNITED STATES PATENT OFFICE 2,279,728

MEASURING SPOUT

Walter Ballard, New York, N. Y.

Application July 15, 1939, Serial No. 284,763

13 Claims. (Cl. 221—98)

My invention relates to measuring devices, and more particularly to a measuring spout for all types of receptacles.

One object of my invention is to provide a measuring spout for receptacles, by means of which a predetermined amount of liquid or any other non-solid substance, whose particles move freely on the slightest pressure, may be poured out of the receptacle in which the liquid or substance is stored.

In order to carry out my invention into practice, I provide a measuring spout for receptacles, comprising: a casing for receiving a certain amount of liquid from the storage receptacle, connecting means adapted to connect said casing with the outlet of the receptacle, a measuring chamber connected with said casing, means for leading at least a portion of the liquid from said casing into said measuring chamber, said measuring chamber being adapted to receive a predetermined amount of said liquid, means for preventing the return of the measured liquid into said casing, and a discharge outlet connected to said measuring chamber.

Although my new measuring spout is especially adapted for the application to cans containing so-called "upper lubrication oil" or "top cylinder oil," the measuring spout may be applied to any receptacle as for example to bottles containing liquor or the like.

The above objects as well as others not particularly pointed out will appear from the following description with reference to the accompanying drawings in which the reference characters in the various figures denote like parts.

Referring to the drawings:

Fig. 1 is an elevational view, partially in section, of a can provided with the measuring spout, tilted for the filling action, Fig. 2 is a front elevational view of Fig. 1 showing the measuring chamber in section, Fig. 3 is a fragmentary elevational view of the can and the spout shown in the intermediate position in which the amount of liquid to be poured out of the can is measured, Fig. 4 is an elevational view of can and spout, partially in section and tilted in the opposite direction for the pouring action, Fig. 5 is a longitudinal section through the spout and part of the can and illustrates the spout adjusted for measuring and dispensing single portions, Fig. 6 is a similar view to Fig. 5, but showing the spout adjusted for measuring and dispensing single portions, Fig. 7 is a similar view to Fig. 5, but showing the spout adjusted, after measuring any quantity, so as to seal the communication aperture, Fig. 8 is a cross-sectional view taken on the line 8—8 of Fig. 5, Fig. 9 is a cross-sectional view taken on the line 9—9 of Fig. 7, Fig. 10 is a similar view to Fig. 5, but the inclined tube is stationary and the measuring container adjustably arranged, Fig. 11 is a modified form of the invention in which the adjustment is attained by rotation of the inner inclined tube and in which the latter and the casing are not co-axial, Fig. 12 is a fragmentary perspective view of Fig. 11 to illustrate the co-operation between the various parts of the inclined rotatable tube and the slotted portion of the gate, and, Fig. 13 is a fragmentary perspective view of the discharge end of the spout in accordance with Figures 11 and 12.

Referring now to all figures, 20 indicates a conventional can containing the liquid 21. The upper wall 22 of said can is provided with an outlet 23, usually closed by a cap or cover (not shown in the drawings), which is screwed on to the threaded wall of said outlet. A handle 24 is secured to the side wall 25 of the can 20.

The measuring spout is indicated in general by 26 and is provided with a base 27 having a passage 28. A conduit 29 connects the base 27 with the casing 30. A screw cap 31 having a hole in the center is rotatably arranged on said conduit 29, and a gasket 32 is placed between said screw cap 31 and said base 27. After removal of the conventional cap (not shown) the base 27 may be placed on the upper edge 33 of the outlet 23. In order to hold the base 27 in its position, the screw cap 31 is screwed to the threaded wall of the outlet 23. During said screwing on of the screw cap 31 the base may be rotated on the upper edge of the outlet 23 and may be adjusted in any desired position, whereupon the base may be tightly pressed on the outlet by tightening the screw cap 31. The casing 30 is substantially of cylindrical form and has outwardly converging end walls 34 and 35. Each of these end walls terminates in cylindrical portions 36 and 37, the latter one turned over on its extreme end in a flange-like portion 38 over which fits an open screw cap 39 having a gasket 38' interposed in a similar fashion as the screw cap 31 over the base 27. An inclined overflow tube 40 is slideably fitted in the cylindrical end portions 36 and 37, interposed between which is the cylindrical gate 54 secured to or part of the casing 30. The latter is arranged co-axially to the inclined overflow tube 40. The axis A—A of the casing 30 (see Fig. 5) is inclined to the axis B—B of the conduit 29. The upper orifice of the tube 40 which is arranged at a level above the uppermost portion 42 (see Fig. 3) of the casing 30 has connected thereto a flexible nozzle 41. The lower end 43 of the inclined tube 40 is connected to the interior of the measuring chamber 44 which is tightly connected to the casing 30 by means of the open screw cap 39. The chamber 44 is preferably made of a transparent material such as glass, artificial resin or the like. The inclined tube 40 has an aperture 45 in the uppermost part of its circumference, located between the cylindrical gate 54 and the lower cylindrical portion 37 of the casing 30. This aperture 45 provides the means of communication between the casing 30 and the lower end of the inclined tube which in turn acts once as a conduit to the measuring chamber 44 and at another time with its lower edge 46 as an overflow which controls the liquid level and therefore the amount of liquid to be dispensed.

The overflow tube 40 is slideably arranged so as to attain by longitudinal displacement of the aperture 45 different levels at which the overflow of the liquid is to take place. By pulling the overflow tube 40 outwardly in the casing (see Fig. 6) the overflow aperture 45 will be located so as to assure a higher liquid level in the measuring chamber 44. By pushing the overflow tube 40 inwardly in the casing 30 (see Fig. 5) the overflow aperture 45 will be situated so as to produce a lower level of the liquid in the measuring chamber 44. If however the overflow tube 40 is pulled out completely from the casing 30 the outwardly bent lower end 47 of the tube 40 will contact the shoulder 38 formed at the outer end of the cylindrical portion 37 of the casing 30. In this position the aperture 45 will be situated within the cylindrical gate 54 and thus the means of communication between the casing 30 and inclined tube 40 and consequently the measuring chamber 44 will be sealed. With this absolutely foolproof arrangement provided no liquid other than the measured quantity in the measuring chamber 44 will flow out of the spout no matter how the device will be tilted during the pouring out motion. For the adjustment of the proper amounts of liquid to be measured and discharged, graduations 55 have been provided on the upper outside surface of the extreme upper end of the inclined tube 40 which in cooperation with the index marker 49 on the outside of the cylindrical portion 37 permit a positive setting.

Whenever the diagonal tube 40 is located more or less inwardly in the casing 30 as is the case in adjusted quantities of less than "double portion," it will be observed that the lower end will be immersed in the fluid contained in the measuring chamber 44. Thus, during the discharge of the liquid (see Fig. 4), when the device is in a position turned around about 90 degrees from the normal position (see Fig. 3), the lower end 43 of the diagonal tube 40 would act as the overflow orifice and thus permit only a partial discharge of the measured liquid. To overcome this condition, the side opposite the aperture 45 has been slotted at 50 so as to provide a passage which will permit the full amount of measured liquid to be poured out. But whenever the tube 40 is pulled outwardly for measuring larger quantities than a "single portion" or to seal the communication aperture 45 of the overflow tube 40, a part or the total length of the passage slot 50 would be situated within the lower converged portion of the casing 30 and thus would provide means of communication of the liquid between the supposedly separated casing 30 and the measuring chamber 44. To overcome this condition, a channel member 51 has been developed between the cylindrical gate 54 and the cylindrical portion 37 of the casing 30, which through its profile of a half ring embraces only the lower half of the diagonal tube 40 by which means it seals the slotted portion extended into the casing 30, but leaves the aperture 45 at the opposite side of the tube open and undisturbed. Thus the communication between the aperture 45 and the casing 30 is maintained, whereas the communication between the latter and the measuring chamber 44 by way of the slot 50 is prevented. The cylindrical gate 54 is suspended by a plurality of arms 52 branching out inwardly from the inside walls of the casing 30 which permits the liquid in the casing 30 to flow freely back and forth by means of the open spaces between the arms 52. The cross section of the measuring chamber 44 is of a form which flares outwardly towards the top of the chamber (see Fig. 2) so as to increase the volume of measured liquid to the double quantity in spite of the slight difference of height between the minimum and maximum level. To prevent leakage from the casing 30 to the measuring chamber 44 or, as in the case of a sealed aperture (see Fig. 7), from the casing 30 into the tube 40 by way of aperture 45, or else from the casing 30 to the outside of the spout, annular grooves are preferably provided in the cylindrical portions 36 and 37 and the cylindrical gate 54, which in addition can be provided with packings if absolutely positive quantities of measured liquid become an issue.

The operation of the measuring spout is as follows. The measuring spout 26 is attached to the outlet 23 of the can 20 as shown in the Figures 1 to 7. Now, if a predetermined amount of the liquid 21 is to be poured out of the can, the can with the spout is first tilted into the position illustrated in Fig. 1. Thus, a quantity of liquid flows into the casing 30 and through the aperture 45 into the measuring chamber 44 by way of the lower end 43 of the inclined tube 40. Now, the unit is returned to its normal position which is shown in Fig. 3. The total measuring space, which is controlled by the lower edge 46 of the aperture 45 and extends horizontally from this point across the interior of the inclined overflow tube 40 into the interior of the measuring chamber 44, retains a positive amount of liquid which cannot return to the casing 30 and which is less than the amount of liquid which filled the combined space of the casing 30, the tube 40 and the chamber 44 as shown in Fig. 3. The excessive amount of liquid 21' (see Figs. 3 and 5) being in the casing 30 returns through the conduit 29 into the can 20 with the exception of the small quantity which is trapped in the casing 30 below the lowest point of the inter-section of the casing and the conduit 29. The excessive quantity of liquid 21'' (see Figs. 3 and 5) being in the upper portion of the tube 40 returns by way of the aperture 45 into the casing 30 and thence into the can 20 through the conduit 29. After the excessive amount of liquid has returned and thus the liquid has leveled itself, the measuring operation has been completed. Referring now to Fig. 4, the unit is tilted in the opposite direction for the discharge of the measured liquid through the flexible nozzle 41. Inasmuch as in this position the aperture 45 is in the uppermost corner of the casing 30 and therefore above the liquid level in the can 20 now additional quantity of liquid can flow into the spout for discharge. Due to the fact that the aperture 45 is only in the uppermost part of the circumference of the tube 40, the measured liquid 53 (see Fig. 4) cannot escape through the aperture 45 into the casing 30. As stated previously, if it seems advisable to separate the measured quantity of liquid and thus avoid any possibility of increasing or decreasing the measured quantity by shaking or tilting the device the tube 40 can be pulled out in its end position for this purpose before the tilting for the discharge takes place. This procedure is most advisable where a measured quantity is kept ready for use at a later time. As described in the introduction of the description of my former Patent No. 2,122,906 various quantities of gasoline are purchased and therefore also various quantities of this "upper lubrication oil" in demand, and it is for this reason that the diagonal overflow tube has been developed adjustably. By this arrangement it is possible to serve and to dispense any desired quantity with greater speed and accuracy inasmuch as this new spout adapts itself very favorably to the ever changing quantities demanded.

As shown in Fig. 10, the inclined inner tube 30' can be stationarily arranged and the adjustment of the various measuring quantities can be attained by the sliding in or out of the measuring container 44' which for this purpose is provided with a tubular extension 40' telescopically engaging with the stationary inclined tube 30' and being provided with a communication slot 40''.

In the modified form illustrated in the Figures 11, 12 and 13 the inclined tube 30' is also stationarily arranged but has a slotted portion 30'' which extends over the whole length of a plurality of ports 62 which are provided in the rotatory tube 60 journalled within the tube 30'. These ports 62 are spaced longitudinally as well as latitudinally which is around the circumference of the tube so as to permit independently either one to register with the slot 30''. The adjustment of these ports which is more clearly shown in the fragmentary view, Fig. 12, is controlled by rotating the most outwardly extending portion 61 of the tube 60 which for this purpose is equipped with markings corresponding with the indicator mark 63.

As illustrated in Figs. 11 and 13, the length axis of the casing and the length axis of the inclined tube are not necessarily the same.

I have described preferred embodiments of my invention, but it is understood that numerous changes and omissions may be made without departing from the spirit of my invention.

What I claim is:

1. A measuring spout for a receptacle containing a liquid and being provided with an outlet spout comprising: a base having a passage, a casing for receiving a certain quantity of liquid from the receptacle and a measuring chamber adapted to receive predetermined quantities of liquid, a pipe-like member rigidly connecting said base with the casing and forming a conduit between the passage of the base and the casing, said casing surrounding an open tube, which is inclined to the base and relatively adjustable to the casing and the lower end of which extends into said measuring chamber, said tube having one or more holes in the upper part of its circumference inside of the casing near said measuring chamber forming a passage for the liquid through the tube to the measuring chamber and determining by their position the amount of liquid to be measured in said measuring chamber, the upper open end of said tube forming a discharge for the measured liquid.

2. A measuring spout as claimed in claim 1, in which the discharge end of the tube projects from the casing and is arranged at a level above the uppermost portion of said casing.

3. A measuring spout for a receptacle containing a liquid and being provided with an outlet spout comprising a base having a passage, a casing for receiving a certain quantity of liquid from the receptacle and a measuring chamber adapted to receive predetermined quantities of liquid, said casing surrounding an open tube, which is inclined to the base and the lower end of which extends into said measuring chamber, said tube being stationarily arranged in the casing, but the mouth of the measuring chamber telescoping into the inclined inner tube and being slideably arranged for varying the measured quantities of liquid.

4. A measuring spout as claimed in claim 1, in which the lower open portion of the inclined slideable tube is immersed in the adjacent measuring chamber and has for means of communication a slotted portion on its lower side.

5. A measuring spout as claimed in claim 1, in which the inclined slideable tube has a slotted portion on the lower side of its lower end and in which the casing is developed in the inside with an apron for the covering up of the slotted communication of the slideable tube when said tube is withdrawn from the measuring chamber into the casing.

6. A measuring spout as claimed in claim 1, in which the inclined slideable tube has a port in the upper quadrant of its circumference and in which a gate is so arranged in the casing as to close this port in its outermost position.

7. A measuring spout as claimed in claim 1, in which the outside of the upper end of the slideable tube is provided with markings for the proper adjustment of the various quantities of the liquid to be measured.

8. A measuring spout as claimed in claim 1, in which the measuring chamber has one or more outwardly flaring walls so as to increase the volume of the measured liquid at a greater proportion as the rise of the liquid level.

9. A measuring spout as claimed in claim 1, in which the inclined tube is diagonally disposed as to extend with its upper end from the upper portion of the upper end wall of the casing and with its lower end from the lower portion of the opposite end wall.

10. A measuring spout as claimed in claim 1, in which the inclined tube is provided with a plurality of ports in the circumference of its lower portion and is rotatably adjustable to an elongated opening of a gate surrounding it.

11. A measuring spout as claimed in claim 1, in which the plurality of ports is distributed over approximately three quadrants of the circumference of a rotatably mounted tube over the length of an opening in a surrounding gate, with which either one of the ports can be selectively adjusted to register.

12. A measuring spout as claimed in claim 1 in which the inclined tube is rotatable and the lower portion of which has approximately one remaining part of its circumference which is not provided with an opening, but can be brought to register with the elongated opening of the gate.

13. In combination: a receptacle for a liquid, said receptacle being provided with an outlet spout, a measuring spout interchangeably mounted on said outlet spout, said measuring spout comprising a base having a passage, a casing for receiving a certain quantity of liquid from said passage, a conduit connecting said casing with said passage and a measuring chamber adapted to receive predetermined quantities of liquid from said casing by means of an inclined tube adjustably mounted in said casing and opening in said measuring chamber, said tube having a port for the liquid in its upper part situated inside of the casing, the opposite portion of said tube being provided with a discharge opening for the measured liquid, said tube having in its lower portion means for the control of the quantities to be measured and for the positive separation of the measured quantities of the liquid from the liquids in the casing and in the said storage receptacle, and which are adjusted by means provided on the upper portion of the inclined tube which extends upwardly from the casing.

WALTER BALLARD.